United States Patent

[11] 3,624,128

[72] Inventors Philip E. Shaw
 Winter Haven, Fla.;
 Dol J. Daum, Albany; Robert L. Clarke, Bethlehem, N.Y.
[21] Appl. No. 585,756
[22] Filed Oct. 11, 1966
[45] Patented Nov. 30, 1971
[73] Assignee Sterling Drug Inc.
 New York, N.Y.

[54] POLYHYDRO-2-NAPHTHYLIDENEACETIC ACIDS AND BASIC ESTERS THEREOF
8 Claims, No Drawings

[52] U.S. Cl.................................................. 260/468 F,
 260/247.2 B, 260/294.3 E, 260/295 CA,
 260/295.5 R, 260/469 R, 260/471 R, 260/472 R,
 260/473 G, 260/476 C, 260/477 R, 260/514 B,
 260/521 A, 260/540 R, 260/526 R, 424/305 R
[51] Int. Cl..................................................... C07c 69/74

[50] Field of Search........................................... 260/468,
 514, 295.5, 247.2, 471, 472, 473, 476, 521, 526,
 540

[56] References Cited
FOREIGN PATENTS
6,505,232 10/1965 Netherlands................. 260/468

Primary Examiner—Lewis Gotts
Assistant Examiner—Paul J. Killos
Attorneys—Elmer J. Lawson, B. Woodrow Wyatt, Thomas L. Johnson, Robert K. Bair, R. Clifford Bourgeois, William G. Webb and Roger T. Wolfe

ABSTRACT: 3,4,4aα,5,6,7,8,8aβ-octahydro-2(1H)-naphthalenone, optionally substituted in the 6-position by oxo, hydroxy or acyloxy, reacts with a tri-lower-alkyl α-phosphono-lower-alkanoate to give the corresponding lower-alkyl octahydro-2-naphthylideneacetate. The latter is hydrolyzed to the free acid, which, via the acid chloride, is esterified with an amino-lower-alkanol, giving basic esters having cardiotonic activity.

POLYHYDRO-2-NAPHTHYLIDENEACETIC ACIDS AND BASIC ESTERS THEREOF

This invention relates to bicyclic substituted acids and esters thereof, and is in particular concerned with polyhydro-2-naphthylideneacetic acids and basic esters thereof.

The compounds of the invention are of the formula

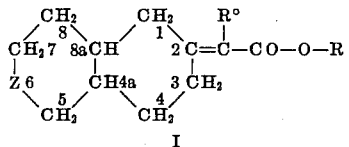

I wherein R is hydrogen, lower-alkyl or amino-lower-alkyl; R° is hydrogen or lower-alkyl; and Z is $CH_2$, $O=C$, $(HO)CH$ or $(acylO)CH$.

The term "lower-alkyl" used above in defining the groups R and R° stands for alkyl groups having up to about six carbon atoms, including such groups as methyl, ethyl, propyl, isopropyl, butyl, hexyl and the like.

When R in formula I stands for an amino-lower-alkyl group, it represents a lower-alkyl group substituted by a basic amino group. The exact nature of the basic amino moiety is not critical, although it is preferred that it have a molecular weight less than about 200. A particularly preferred type of amino-lower-alkyl group has the structure $-Y-N=B$ wherein Y is lower-alkylene of two to five carbon atoms and $N=B$ is unsubstituted amino, lower-alkylamino, di-lower-alkylamino, polymethylenimino of five to seven ring carbons and lower-alkylated derivatives thereof, 4-morpholinyl and lower-alkylated derivatives thereof, or 1-piperazinyl and lower-alkylated derivatives thereof. The term "lower-alkyl" as used in defining portions of the amino moiety $N=B$ stands for alkyl groups having up to about six carbon atoms.

When Z in formula I above stands for $(acylO)CH$, the acyl groups are carboxylic acyl groups having from one to 12 carbon atoms and molecular weights less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has five to six ring members, e.g., β-cyclopentylpropionyl, β-cyclohexylpropionyl, and the like; benzoyl; phenyl-lower-alkanoyl or alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl, N-phenylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups preferably have from one to four carbons atoms.

The invention is not limited to any particular stereochemical configuration of the compounds of formula I. The hydrogens at the ring junctions can be either in the trans (4aα, 8aα) or cis (4aα,8aα) relationship to one another.

The compounds of formula I wherein R is lower-alkyl and Z is $CH_2$, $(HO)CH$ or $(acylO)CH$, are prepared by reacting a compound of the formula

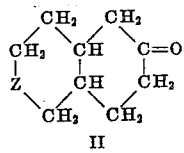

II wherein Z is $CH_2$, $(HO)CH$ or $(acylO)CH$ with a tri-lower-alkyl α-phosphono-lower-alkanoate of the formula

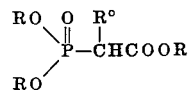

in the presence of a basic compound capable of acting as a proton acceptor. Examples of such basic compounds are alkali metal alkoxides, amides or hydrides, e.g., sodium methoxide, sodium amide and sodium hydride, and the reaction is preferably carried out in nonaqueous medium at ordinary temperatures.

The compounds of formula I wherein R is hydrogen are prepared by alkaline hydrolysis of the compounds of formula I wherein R is lower-alkyl.

The compounds of formula I wherein R is amino-lower-alkyl are prepared by esterification of the compounds of formula I wherein R is hydrogen by employing the appropriate amino-lower-alkanol or amino-lower-alkyl halide. A preferred method comprises reacting the acid halide (e.g., chloride or bromide) of a free acid of formula I with an amino-lower-alkanol, although an alternative procedure involves reacting an alkali metal salt (e.g., sodium salt) of the acid with a tertiary amino-lower-alkyl halide (e.g., chloride or bromide). Surprisingly, the acid halide process can be used even in the presence of a free hydroxy group $[Z=(HO)CH]$. It appears that if reaction does occur at the hydroxy group during acid chloride formation, the hydroxy group is regenerated during the preparation of the basic ester.

The reaction of compounds of formula II with a tri-lower-alkyl α-phosphono-lower-alkanoate gives a mixture of geometric isomers (cis and trans) involving the groups about the exocyclic double bond. Although in many instances it is possible to separate the isomers by physical means, it is not essential to the present invention that the isomers be separated because there is little difference in the physiological properties of the isomers.

The compounds of formula I wherein Z is $O=C$ are prepared by oxidation of the compounds of formula I where Z is $(HO)CH$, for example, by treatment of the latter with chromic oxide in pyridine solution.

The structures of the compounds of the invention were established by the modes of synthesis, by elementary analysis, by interpretation of their infrared, ultraviolet and NMR spectra, and by their behavior in thin layer chromatography (TLC) and gas-liquid phase chromatography (glpc).

The compounds of formula I wherein R is amino-lower-alkyl are basic in nature and form acid-addition salts with moderate to strong inorganic or organic acids. Said acid-addition salt forms are within the purview of the invention and are considered the full equivalents of the corresponding free bases. For pharmacological purposes it is preferred to use water-soluble, pharmaceutically acceptable acid-addition salts, although all acid-addition salts are useful as characterizing derivatives of and as intermediates in the purification of the free bases.

Pharmacological evaluation of the basic ester compounds of the invention has shown that they possess cardiotonic activity similar to that shown by the natural product cassaine and are thus useful in increasing the ventricular contractile force of the mammalian heart. The $ED_{20}$ values (intravenous dose in mg./kg. necessary to produce a 20 percent increase in ventricular contractile force) range from about 1.0 to about 4.0. The compounds are prepared for use in the form of a sterile aqueous solution of a water-soluble, pharmaceutically acceptable acid-addition salt.

The following examples will further illustrate the invention without the latter being limited thereby.

EXAMPLE 1

Methyl 3,4,4aα,5,6,7,8,8aβ-Octahydro-6β-hydroxy-$\Delta^{2(1H),\alpha}$-naphthaleneacetate [I; R is $CH_3$, R° is H, Z is (β-HO)CH, 4aα,8aβ-configuration].

A solution of 8.41 g. (0.156 mole) of sodium methoxide and 28.1 g. (0.154 mole) of trimethyl phosphonacetate in 125 ml. of dry dimethylformamide was stirred for 5 minutes at room temperature and then a solution of 13.15 g. (0.0783 mole) of 3,4,4aα,5,6,7,8,8aβ-octahydro-6β-hydroxy-2(1H)-naphthalenone in 33 ml. of dry dimethylformamide was added in a single portion. This mixture was stirred at room temperature for 45 minutes, poured into ice and water and neutralized with 2N hydrochloric acid. The product was extracted with ether and the extracts were washed with brine and concentrated to effect precipitation of 4.4 g. of product, m.p. 74°–90° C. The mother liquor residue was chromatographed on 250 g. of silica gel using 1:4 → 1:1 ether-pentane to elute an additional 3.76 g. of product, m.p. 74°–77° C. A 14 percent recovery of starting material was also obtained from the column. The 8.16 g. (47 percent of product was recrystallized from ether with hexane added to give 3.45 g. of methyl 3,4,4aα,5,6,7,8,8aβ-octahydro-6β-hydroxy-$\Delta^{2(1H),\alpha}$-naphthaleneacetate, m.p. 79°–97° C.

By replacing the trimethyl phosphonoacetate in the foregoing preparation by a molar equivalent amount of triethyl α-phosphonopropionate, there can be obtained ethyl 3,4,4aα,5,6,7,8,8aβ-octahydro-6β-hydroxy-$\Delta^{2(1H),\alpha}$-naphthalenepropionate [I; R is $C_2H_5$, R° is $CH_3$, Z is (β-HO)CH, 4aα,8aβ-configuration].

By replacing the 3,4,4aα,5,6,7,8,8aβ-octahydro-6β-hydroxy-2(1H)-naphthalenone in the foregoing preparation by a molar equivalent amount of 3,4,4aα,5,6,7,8,8aβ-octahydro-2(1H)-naphthalenone, 3,4,4aα,5,6,7,8,8aα-octahydro-2(1H)-naphthalenone, or 3,4,4aα,5,6,7,8,8aα-octahydro-6α-hydroxy-2(1H-naphthalenone, there can be obtained, respectively, methyl 3,4,4aα,5,6,7,8,8aβ-octahydro-$\Delta^{2(1H)}$-naphthaleneacetate [I; R is $CH_3$, R° is H, Z is $CH_2$, 4aα,8aβ-configuration], methyl 3,4,4aα,5,6,7,8aα-octahydro-$\Delta^{2(1H)}$-naphthaleneacetate [I; R is $CH_3$, R° is H, Z is $CH_2$, 4aα,8aα-configuration], or methyl 3,4,4aα,5,6,7,8,8aα-octahydro-6α-hydroxy-$\Delta^{2(1H)}$-naphthaleneacetate [I; R is $CH_3$, R° is H, Z is (α-HO)CH, 4aα,8aα-configuration].

Methyl 3,4,4aα,5,6,7,8,8aβ-octahydro-6β-hydroxy-$\Delta^{2(1H),\alpha}$-naphthaleneacetate can be oxidized with chromic acid in pyridine to give methyl 3,4,4aα,5,6,7,8,8aβ-octahydro-6-oxo-$\Delta^{2(1H),}$-naphthaleneacetate [I; R is $CH_3$, R° is H, Z is O=C, 4aα,8aβ-configuration].

Methyl 3,4,4aα,5,6,7,8,8aβ-octahydro-6β-hydroxy-$\Delta^{2(1H),\alpha}$-naphthaleneacetate can be reacted with phenylisocyanate in acetonitrile solution, heated under reflux for several hours to give methyl 3,4,4aα,5,6,7,8,8aβ-octahydro-6β-(N-phenylcarbamoyloxy-$\Delta^{2(1H),\alpha}$-naphthaleneacetate [I; R is $CH_3$, R° is H, Z is (β-$C_6H_5$NHCOO)CH, 4aα,8aβ-configuration].

EXAMPLE 2

3,4,4aα,5,6,7,8,8aβ-Octahydro-6β-hydroxy-$\Delta^{2(1H),\alpha}$-naphthaleneacetic acid [I; R and R° are H, Z is (β-HO)CH, 4aα,8aβ-configuration].

A solution of 5.5 g. (0.025 mole) of methyl 3,4,4aα,5,6,7,8,8aβ-octahydro-6β-hydroxy-$\Delta^{2(1H),\alpha}$-naphthaleneacetate (example 1) in 170 ml. of 95 percent ethanol was treated with 68 ml. (0.14 mole) of 2N aqueous sodium hydroxide and heated under reflux for 90 minutes. The alcohol was removed by warming the mixture under reduced pressure and the aqueous solution (with more water added if the sodium salt of the product had partially precipitated) was washed with ether. The aqueous solution was acidified with 2N hydrochloric acid and the precipitated acid was extracted with ether. The extract was washed with brine, dried ($Na_2SO_4$) and concentrated to a residue which crystallized upon trituration with ethyl acetate. Two recrystallizations from ethyl acetate gave 3.0 g. (58 percent) of 3,4,4aα,aβ-octahydro-6β-hydroxy-$\Delta^{2(1H),\alpha}$-naphthaleneacetic acid, m.p. 170°–189° C.

By the foregoing procedure the following acids can be prepared from the corresponding lower-alkyl esters:

3,4,4aα,5,6,7,8,8aβ-Octahydro-6β-hydroxy-$\Delta^{2(1H),\alpha}$-naphthalenepropionic acid [I; R is H, R° is $CH_3$, Z is (β-HO)CH, 4aα,8aβ-configuration], 3,4,4aα,5,6,7,8,8aβ-Octahydro-$\Delta^{2(1H),\alpha}$-naphthaleneacetic acid [I; R and R° are H, Z is $CH_2$, 4aα,8aβ-configuration], 3,4,4aα,5,6,7,8,8aα-Octahydro-$\Delta^{2(1H),\alpha}$-naphthaleneacetic acid [I; R and R° are H, Z is $CH_2$, 4aα,8aα-configuration], 3,4,4aα,5,6,7,8,8aα-Octahydro-6α-hydroxy-$\Delta^{2(1H),\alpha}$-naphthaleneacetic acid [I; R and R° are H, Z is (α-HO)CH, 4aα,8aα-configuration], 3,4,4aα,5,6,7,8,8aβ-Octahydro-6-oxo-$\Delta^{2(1H),\alpha}$-naphthaleneacetic acid [I; R and R° are H, Z is O C, 4aα, 8aβ-configuration], 3,4,4aα,5,6,7,8,8aβ-Octahydro-6β-(N-phenylsarbamoyloxy)-$\Delta^{2(1H),\alpha}$-naphthaleneacetic acid [I; R and R° are H, Z is (β-$C_6H_5$NHCOO)CH, 4aα,8aβ-configuration].

EXAMPLE 3

2-Dimethylaminoethyl 3,4,4aα,5,6,7,8,8aβ-octahydro-6β-hydroxy-$\Delta^{2(1H),\alpha}$-naphthaleneacetate [I; R is $CH_2CH_2N(Ch_3)_2$, R° is H, Z is (β-HO)CH, 4aα,8aβ-configuration].

A solution of 7.95 g. (0.0378 mole) of 3,4,4aα,5,6,7,8,8aβ-octahydro-6β-hydroxy-$\Delta^{2(1H),\alpha}$-naphthaleneacetic acid (example 2) in 150 ml. of tetrahydrofuran was treated with 2.04 g. (0.0378 mole) of sodium methoxide and the mixture was stirred for 5 minutes and concentrated to a residue by warming under reduced pressure. A suspension of the residue in 150 ml. of dry benzene and 7 ml. of pyridine was stirred in an ice bath while 50 ml. of oxalyl chloride was added. This mixture was stirred for 5 minutes cold and for 30 minutes at room temperature and then concentrated to a residue at below 40° C. A suspension of the residue in 50 ml. of benzene was treated with 50 ml. of 2-dimethylaminoethanol with cooling and stirring and this mixture was heated on a steam bath for 10 minutes. It was cooled and diluted with 800 ml. of ether and 600 ml. of saturated sodium carbonate solution. The layers were separated and the water layer was washed with ether and discarded. The combined ether layers were extracted with two 100 ml. portions of 2N hydrochloric acid and the combined extracts were made basic with sodium hydroxide solution. The alkaline mixture was extracted with ether and the extracts were washed with brine, dried ($Na_2SO_4$), and concentrated. The product was purified by partition chromatography. The solvent system employed was a 12:1:2:0.2 mixture of hexane, ethylene dichloride, methanol and water. Infusorial earth (360 g.) was wet with 275 ml. of the polar phase containing 90 mg. of bromocresol purple, the color of the mixture was adjusted to a pale creamy yellow (faintly acid) by gaseous hydrogen chloride and the solid was packed into a column 9 cm. in diameter. The sample was dispersed on 16 g. of infusorial earth and placed on the top of the column. Elution of the column with the nonpolar phase of the solvent mixture developed the column; the position of all basic material was clearly revealed by blue bands. The product was recovered either by elution or slicing of the column, depending on the separation of the bands. In the present case the product was eluted to yield 7.74 g. (73 percent) of 2-dimethylaminoethyl 3,4,4a α,5,6,7,8,8aβ-octahydro-6β-hydroxy-$\Delta^{2(1H),\alpha}$-naphthaleneacetate as an oil, obtained in the form of its hydrochloride salt, m.p. 173°–185° C. when recrystallized from acetone.

By replacing the 2-dimethylaminoethanol in the foregoing preparation by a molar equivalent amount of 3-dibutylaminopropanol, 2-(1-piperidyl)ethanol, 2-(1-pyrrolidyl)ethanol, 2-(4-morpholinyl)ethanyl, 2-(4-methyl-1-piperidyl)ethanol, or 2-(4-methyl-1-piperazinyl)ethanol, there can be obtained, respectively, 3-dibutylaminopropyl 3,4,4aα,5,6,7,8,8aβ-octahydro-6β-hydroxy-$\Delta^{2(1H),\alpha}$-naphthaleneacetate [I; R is CH₂CH₂CH₂N(C₄H₉)₂, R° is H, Z is (β-HO)CH, 4aα,8aβ-configuration], 2-(1-piperidyl)ethyl 3,4,4aα,5,6,7,8,8aβ-octahydro-6β-hydroxy-Δ²⁽¹ᴴ⁾,ᵅnaphthaleneacetate [I; R is CH₂CH₂N(CH₂)₅, R° is H, Z is (β-HO)CH, 4aα,8aβ- configuration], 2-(1-pyrrolidyl)ethyl 3,4,4aα,5,6,7,8,8aβ-octahydro-6β-hydroxy-Δ²⁽¹ᴴ⁾,ᵅ-naphthaleneacetate [I; R is CH₂CH₂N(CH₂)₄, R° is H, Z is (β-HO)CH, 4aα,8aβ-configuration], 2-(4-morpholinyl)ethyl 3,4,4aα,5,6,7,8aβ-octahydro-6β-hydroxy-Δ²⁽¹ᴴ⁾, -naphthaleneacetate [I; R is CH₂CH₂N(CH₂)₂O, R° is H, Z is (β-HO)CH, 4aα,8aβ-configuration], 2-(4methyl-1-piperidyl)-ethyl 3,4,4aα,5,6,7,8,8aβ-octahydro-6β-hydroxy-Δ²⁽¹ᴴ⁾,ᵅnaphthaleneacetate [I; R is CH₂CH₂N(CH₂)₄CHCH₃, R° is H, Z is (β-HO)CH, 4aα,8aβ-configuration], or 2-(4-methyl-1-piperazinyl)-ethyl 3,4,4aα,5,6,7,8,8aβ-octahydro-6β-hydroxy-Δ²⁽¹ᴴ⁾,ᵅ-naphthaleneacetate [I; R is CH₂CH₂N(CH₂)₄NCH₃, R° is H, Z is (β-HO)CH, 4aα,8aβ-configuration].

The following basic esters can similarly be prepared from the corresponding acids:

2-Dimethylaminoethyl 3,4,4aα,5,6,7,8,8aβ-octahydro-6β-hydroxy-Δ²⁽¹ᴴ⁾,ᵅ-naphthalenepropionate [I; R is CH₂CH₂N(CH₃)₂, R° is CH₃, Z is (β-HO)CH, 4aα,8aβ-configuration], 2-Dimethylaminoethyl 3,4,4aα,5,6,7,8,8aβ-octahydro-Δ²⁽¹ᴴ⁾,ᵅ-naphthaleneacetate [I; R is CH₂CH₂N(CH₃)₂, R° is H, Z is CH₂, 4aα,8aβ-configuration], 2-Dimethylaminoethyl 3,4,4aα,5,6,7,8,8aα-octahydro-Δ²⁽¹ᴴ⁾, -naphthaleneacetate [I; R is CH₂CH₂N(CH₃)₂, R° is H, Z is CH₂, 4aα,8aα-configuration], 2-Dimethylaminoethyl 3,4,4aα,5,6,7,8,8aα-octahydro-6α-hydroxy-Δ²⁽¹ᴴ⁾, -naphthaleneacetate [I; R is CH₂CH₂N(CH₃)₂, R° is H, Z is (α-HO)CH, 4aα,8aα-configuration], 2-Dimethylaminoethyl 3,4,4aα,5,6,7,8,8aβ-octahydro-6-oxo-Δ²⁽¹ᴴ⁾,ᵅ-naphthaleneacetate [I; R is CH₂CH₂N(CH₃)₂, R° is H, Z is O═C, 4aα,8aβ-configuration], 2-Dimethylaminoethyl 3,4,4aα,5,6,7,8,8aβ-octahydro-6β-(N-phenylcarbamoyloxy)-Δ²⁽¹ᴴ⁾,ᵅ-naphthaleneacetate [I; R is CH₂CH₂N(CH₃)₂, R° is H, Z is (β-C₆H₅NHCOO)CH, 4aα,8aβ-configuration].

EXAMPLE 4

2-Dimethylaminoethyl 3,4,4aα,5,6,7,8,8aβ-octahydro-6β-acetoxy-Δ²⁽¹ᴴ⁾,ᵅ-naphthaleneacetate [I; R is CH₂CH₂N(CH₃)₂, R° is H, Z is (β-CH₃COO)CH, 4aα,8aβ-configuration] was prepared by treating 2.12 g. of the free base form of the product of example 3 with 10 ml. of acetic anhydride and 10 ml. of pyridine overnight at room temperature. The solution was diluted with cold water, made strongly basic with dilute sodium hydroxide and extracted with ether. The extract was washed with brine and concentrated to a residue which was purified by partition chromatography as described above but using 60 g. of infusorial earth. The less polar of the two bands contained 1.79 g. (73 percent) of the desired acetate. It was converted to its hydrochloride salt which was recrystallized by dissolution in acetone followed by addition of ethyl acetate with boiling until the acetone was largely removed. The 2-dimethylaminoethyl 3,4,4aα,5,6,7,8,8aβ-octahydro- 6β-acetoxy-Δ²⁽¹ᴴ⁾,ᵅ-naphthaleneacetate in the form of its hydrochloride salt thus obtained melted at 160°–195° C.

By replacing the acetic anhydride in the foregoing preparation by a molar equivalent amount of caproyl chloride, benzoyl chloride, p-methoxybenzoyl chloride, β-cyclopentylpropionyl chloride, cinnamoyl chloride or nicotinoyl chloride, there can be obtained, respectively, the 6-caproate, 6-benzoate, 6-(p-methoxybenzoate), 6-(β-cyclopentylpropionate), 6-cinnamate or 6-nicotinate of 2-dimethylaminoethyl 3,4,4aα,5,6,7,8,8aβ-octahydro-6β-hydroxy-Δ²⁽¹ᴴ⁾,ᵅ-naphthaleneacetate.

3,4,4aα,5,6,7,8,8aβ-Octahydro-6β-hydroxy-Δ²⁽¹ᴴ⁾,ᵅ-naphthaleneacetic acid can be converted to the sodium salt with one equivalent of sodium methoxide in dimethylsulfoxide solution, and said sodium salt then caused to react with benzyl 2-bromoethylcarbamate or benzyl (N-methyl)-2bromoethylcarbamate to give, respectively, 2-(carbobenzoxyamino)-ethyl 3,4,4aα,5,6,7,8,8aβ-octahydro-6β-hydroxy-Δ²⁽¹ᴴ⁾,ᵅ-naphthaleneacetate, or 2-[carbobenzoxy-(N-methyl)amino]-ethyl 3,4,4aα,5,6,7,8,8aβ-octahydro-6β-hydroxy-Δ²⁽¹ᴴ⁾,ᵅ-naphthaleneacetate. The latter two compounds, when treated with trifluoroacetic acid, 1 day at room temperature, can be converted, respectively, to 2-aminoethyl 3,4,4aα,5,6,7,8,8aβ-octahydro-6β-hydroxy-Δ²⁽¹ᴴ⁾,ᵅ-naphthaleneacetate [I; R is CH₂CH₂NH₂, R° is H, Z is (β-HO)CH, 4aα,8aβ-configuration], or 2-methylaminoethyl 3,4,4aα,5,6,7,8,8aβ-octahydro-6β-hydroxy-Δ²⁽¹ᴴ⁾,ᵅ-naphthaleneacetate [I; R is CH₂CH₂NH CH₃, R° is H, Z is (β-HO)CH, 4 aα,8aβ-configuration].

We claim:
1. A compound of the formula

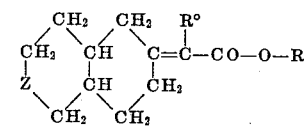

wherein R is hydrogen, lower-alkyl or amino-lower-alkyl; R° is hydrogen or lower-alkyl; and Z is CH₂, O═C, (HO)CH or (acylO)CH, acyl being selected from the group consisting of lower-alkanoyl of up to 12 carbon atoms, cycloalkyl-lower-alkanoyl wherein cycloalkyl has five to six ring members, benzoyl, phenyl-lower-alkanoyl, phenyl-lower-alkenoyl, phenoxy-lower-alkanoyl, carbamyl, N-lower-alkylcarbamyl, N-phenylcarbamyl, N,N-di-lower-alkylcarbamyl, nicotinoyl and isonicotinoyl, and wherein the phenyl group of any of the acyls can be unsubstituted or substituted by lower-alkyl, lower-alkoxy, halogen or nitro.

2. A compound according to claim 1 wherein R is lower-alkyl.

3. Lower-alkyl 3,4,4aα,5,6,7,8,8aβ-octahydro-6β-hydroxy-Δ²⁽¹ᴴ⁾,ᵅ-naphthaleneacetate, according to claim 2, wherein R° is hydrogen and Z is (β-HO)CH.

4. A compound according to claim 1 wherein R is hydrogen.

5. 3,4,4aα,5,6,7,8,8aβ-Octahydro-6β-hydroxy-Δ²⁽¹ᴴ⁾,ᵅ-naphthaleneacetic acid, according to claim 4, wherein R°, is hydrogen and Z is (β-HO)CH.

6. A compound according to claim 1 wherein R is amino-lower-alkyl.

7. 2-Dimethylaminoethyl 3,4,4aα,5,6,7,8,8aβ-octahydro-6 β-hydroxy-Δ²⁽¹ᴴ⁾,ᵅ-naphthaleneacetate, according to claim 6, wherein R is 2-dimethylaminoethyl, R° is hydrogen and Z is (β-HO)CH.

8. 2-Dimethylaminoethyl 3,4,4aα,5,6,7,8,8aβ-octahydro-6 β-acetoxy-Δ²⁽¹ᴴ⁾,ᵅ-naphthaleneacetate, according to claim 6, wherein R is 2-dimethylaminoethyl, R° is hydrogen and Z is (β-CH₃COO)CH.

* * * * *

PO-1050
(5/69)

UNITED STATES PATENT OFFICE
CERTIFICATE OF CORRECTION

Patent No. 3,624,128            Dated November 30, 1971

Inventor(s) Philip E. Shaw, Sol J. Daum and Robert L. Clarke

It is certified that error appears in the above-identified patent and that said Letters Patent are hereby corrected as shown below:

Cover page, column 1, line 3, "Dol" should read --Sol--.

Column 3, line 6, "phosphonacetate" should read --phosphonoacetate--; line 48, "$\Delta^{2(1H)}, -$" should read --$\Delta^{2(1H),\alpha}_-$--.

Column 4, line 1, "3,4,4a$\alpha$,a$\beta$" should read --3,4,4a$\alpha$,5,6,7,8,8a$\beta$--; line 17, "O C" should read --O=C--; line 19, "phenylsarbamoylox-" should read --phenylcarbamoylox- --; line 72, "ethanyl" should read --ethanol--.

Column 5, line 9, "$\Delta^{2(1H)}, -$" should read --$\Delta^{2(1H),\alpha}_-$--; line 26 "2(1H)," should read --2(1H),$\alpha$--; line 29, "$\Delta^{2(1H)}, -$" should read --$\Delta^{2(1H),\alpha}_-$--; line 34, "O C" should read --O=C--.

Column 6, line 33, Claim 1, "O C" should read --O=C--.

Column 1, lines 62 and 63, "trans (4a$\alpha$,8a$\alpha$)" should read --trans (4a$\alpha$,8a$\beta$)--.

Column 3, line 40, "3,4,4a$\alpha$,5,6,7,8a$\alpha$" should read --3,4,4a$\alpha$,5,6,7,8,8a$\alpha$--.

Column 5, line 8, "3,4,4a$\alpha$,5,6,7,8a$\beta$" should read --3,4,4a$\alpha$,5,6,7,8,8a$\beta$--.

Column 5, line 14, "3,4,4a$\alpha$,5,6,7,8a$\beta$" should read --3,4,4a$\alpha$,5,6,7,8,8a$\beta$--.

Signed and sealed this 4th day of July 1972.

(SEAL)
Attest:

EDWARD M. FLETCHER, JR.            ROBERT GOTTSCHALK
Attesting Officer            Commissioner of Patents